United States Patent
Sharrow et al.

(10) Patent No.: US 10,612,420 B2
(45) Date of Patent: Apr. 7, 2020

(54) SUPPORT STRUCTURES FOR ROTORS

(71) Applicant: General Electric Company, Schenectady, NY (US)

(72) Inventors: Edward John Sharrow, Glenville, NY (US); Craig Daniel Ivancic, Gloversville, NY (US); David Montgomery Ritz, Feura Bush, NY (US)

(73) Assignee: General Electric Company, Schenectady, NY (US)

( * ) Notice: Subject to any disclaimer, the term of this patent is extended or adjusted under 35 U.S.C. 154(b) by 547 days.

(21) Appl. No.: 15/354,510

(22) Filed: Nov. 17, 2016

(65) Prior Publication Data

US 2018/0135465 A1 May 17, 2018

(51) Int. Cl.
  *F01D 25/28* (2006.01)
  *F01D 25/16* (2006.01)
  (Continued)

(52) U.S. Cl.
  CPC .......... *F01D 25/28* (2013.01); *F01D 25/162* (2013.01); *F01D 25/164* (2013.01); *F01D 25/18* (2013.01);
  (Continued)

(58) Field of Classification Search
  CPC . F02C 7/20; F01D 25/28; F01D 25/18; F01D 25/164; F01D 25/162; F01D 25/285; F16C 23/04; F16C 35/02
  (Continued)

(56) References Cited

U.S. PATENT DOCUMENTS 3,948,576 A    4/1976  Riegler et al.
4,256,353 A *  3/1981  Fischer ............... F01D 25/164
                                                 384/248
(Continued)

FOREIGN PATENT DOCUMENTS

CA    2 683 382 C    2/2013
CN    202152796 U    2/2012
(Continued)

OTHER PUBLICATIONS

"Lamina Flat Products." Dayton Lamina. https://www.daytonlamina.com/sites/default/files/doc/FlatProducts.pdf.*
(Continued)

*Primary Examiner* — Justin D Seabe
*Assistant Examiner* — Hakeem M Abdellaoui
(74) *Attorney, Agent, or Firm* — Charlotte Wilson; Hoffman Warnick LLC

(57) ABSTRACT

Rotor support structures for industrial machines are disclosed. The support structures may include a rigid base component including a top portion, a slide plate positioned above the rigid base component, and a bearing housing for a rotor, coupled to the slide plate. The bearing housing and the slide plate may be configured to slide or move over the rigid base component. The support structure may also include a plurality of retention blocks coupled to the bearing housing. Each of the plurality of retention blocks may include a moveable retention pin positioned through each of the plurality of retention blocks. The axial movement of the bearing housing and slide plate may compensate for thermal expansion of a turbine shell and/or may reduce vibrations of the rotor and bearing housing during operation of the industrial machines.

8 Claims, 5 Drawing Sheets

(51) Int. Cl.
*F16C 35/02* (2006.01)
*F16C 23/04* (2006.01)
*F01D 25/18* (2006.01)
*F16C 17/02* (2006.01)
*F16C 33/10* (2006.01)
*F16C 25/04* (2006.01)

(52) U.S. Cl.
CPC .............. *F16C 23/04* (2013.01); *F16C 35/02* (2013.01); *F05D 2220/32* (2013.01); *F05D 2230/642* (2013.01); *F05D 2240/30* (2013.01); *F05D 2260/31* (2013.01); *F05D 2260/98* (2013.01); *F16C 17/02* (2013.01); *F16C 25/04* (2013.01); *F16C 33/1045* (2013.01); *Y02E 20/16* (2013.01)

(58) Field of Classification Search
USPC ....................................................... 415/213.1
See application file for complete search history.

(56) References Cited

U.S. PATENT DOCUMENTS

| | | | | |
|---|---|---|---|---|
| 5,421,702 | A * | 6/1995 | Revak | F01D 25/20 184/6.28 |
| 5,509,782 | A | 4/1996 | Streeter | |
| 5,542,642 | A * | 8/1996 | Rivard | F01D 25/28 248/676 |
| 6,279,309 | B1 * | 8/2001 | Lawlor | F01D 25/285 60/39.35 |
| 6,402,381 | B1 | 6/2002 | Shirai et al. | |
| 6,833,632 | B2 * | 12/2004 | Becker | F03D 15/10 290/55 |
| 7,546,742 | B2 * | 6/2009 | Wakeman | F01D 25/162 60/791 |
| 8,403,628 | B2 * | 3/2013 | Koza | F01D 25/24 415/108 |
| 8,449,248 | B2 | 5/2013 | Mulcaire | |
| 9,004,763 | B2 | 4/2015 | Saito | |
| 9,039,346 | B2 * | 5/2015 | Muralidharan | F01D 25/14 415/47 |
| 9,109,800 | B2 * | 8/2015 | Auzelyte | F23J 13/04 |
| 9,376,934 | B2 * | 6/2016 | Cooper | F01D 25/24 |
| 9,822,798 | B2 * | 11/2017 | Yoshida | F04D 29/644 |
| 2003/0033817 | A1 * | 2/2003 | Huster | F01D 25/164 60/797 |
| 2005/0275300 | A1 * | 12/2005 | El-Shafei | F16C 17/02 310/90.5 |
| 2006/0117756 | A1 * | 6/2006 | Wakeman | F01D 25/162 60/772 |
| 2008/0104836 | A1 * | 5/2008 | Gratton | B23P 6/00 29/888.011 |
| 2010/0095683 | A1 * | 4/2010 | Glynn | F01D 25/28 60/796 |
| 2010/0254810 | A1 | 10/2010 | Mulcaire | |
| 2011/0142605 | A1 * | 6/2011 | Koza | F01D 25/24 415/182.1 |
| 2012/0192631 | A1 * | 8/2012 | Tecza | F01D 21/003 73/112.01 |
| 2013/0189088 | A1 * | 7/2013 | Nanda | F01D 9/065 415/177 |
| 2014/0053394 | A1 * | 2/2014 | Cooper | F01D 25/24 29/726 |
| 2014/0334919 | A1 * | 11/2014 | Misawa | F01D 25/162 415/170.1 |
| 2015/0204242 | A1 | 7/2015 | Clarke | |
| 2015/0283660 | A1 * | 10/2015 | Cassidy | B23P 6/002 409/205 |
| 2017/0159872 | A1 * | 6/2017 | Mistry | F01D 25/28 |
| 2017/0248034 | A1 * | 8/2017 | Dzieciol | F01D 25/285 |
| 2018/0195414 | A1 * | 7/2018 | Backasch | F01D 25/243 |
| 2018/0209337 | A1 * | 7/2018 | Russo | F01D 25/28 |
| 2018/0238195 | A1 * | 8/2018 | Nguyen | F02C 7/20 |
| 2018/0320555 | A1 * | 11/2018 | Heo | F01D 25/26 |
| 2019/0017415 | A1 * | 1/2019 | Demianovich | F01D 25/28 |

FOREIGN PATENT DOCUMENTS

| | | |
|---|---|---|
| EP | 2256303 A2 | 12/2010 |
| EP | 2808499 A1 | 12/2014 |
| EP | 2896862 A1 | 7/2015 |
| JP | 2005233080 A | 9/2005 |

OTHER PUBLICATIONS

Illustration of Design for rotor support structure published Oct. 2014; pp. 1.

Extended European Search Report and Opinion issued in connection with corresponding EP Application No. 17201031.6 dated Mar. 14, 2018.

* cited by examiner

SUPPORT STRUCTURES FOR ROTORS

BACKGROUND OF THE INVENTION

The disclosure relates generally to support structures, and more particularly, to support structures for rotors of industrial machines.

In conventional power or turbine systems, a rotor of the system is typically supported adjacent to or at one or both ends of the rotor. The rotor may be supported by a number of structures or housings that help to maintain the rotor within the system. Specifically, a portion or end(s) of the rotor may be positioned within and supported by these conventional structures or housings during operation of the turbine system. Additionally, these structures or housings are configured to allow the rotor to freely spin within the system and in the structure or housing. To help support and stabilize the rotor and the structure of the turbine system, conventional structures or housings are typically coupled to a stationary enclosure surrounding the rotor of the turbine system.

During operation of conventional turbine systems, the components or parts of the system heat-up. As a result, some of these components undergo thermal expansion. To compensate for the thermal expansion of these components, other portions of the turbine system must be designed to move and/or flex. For example, to compensate for the thermal expansion of the rotor and/or the enclosure surrounding the rotor, the structure or housing supporting the rotor may be designed to move (e.g., axially). In conventional systems, the movement of structure or housing supporting the rotor may be controlled by flex legs, typically formed by thin and flexible metal plates. The flex legs may be fixed to and support the structure or housing. These flex legs may bend, flex and/or deflect to allow the structure or housing supporting the rotor to move with the thermally expanding enclosure and/or rotor.

However, the use of the flex legs within the turbine system may present other issues or problems during operation. For example, the rotor of the turbine system may spin at high-speeds during operation. Because of the flexible characteristics of the flex legs and the resulting movement of the structure or housing supporting the rotor, the rotor spinning at high-speeds may also experience high vibrations. The vibrations may increase as the operational speed of the rotor increases. The vibration of the rotor may decrease the efficiency and/or operational performance of the rotor and ultimately the turbine system. Additionally as the vibrations of the rotor increases, the flex legs may become excited and eventually begin to vibrate or flutter (e.g., harmonic motion) as well. The fluttering of the flex legs often "trips" the turbine system due to excessive vibration of the rotor, which causes the system to shut down. As a result, to avoid tripping the turbine system, the rotor may be required to operate at less than full speed, which means the turbine system is operating at a reduced capacity. Furthermore, increasing the size, thickness and/or number of flex legs may help to reduce the vibration of the rotor, but typically is not feasible due to the clearance space within the turbine system and/or the thermal expansion of the various components of the turbine system.

BRIEF DESCRIPTION OF THE INVENTION

A first aspect of the disclosure provides a support structure for a rotor. The support structure includes a rigid base component including a top portion; a slide plate positioned above the top portion of rigid base component; a bearing housing for the rotor coupled to the slide plate, the bearing housing and the slide plate configured to slide over the top portion of the rigid base component; and a plurality of retention blocks coupled to the bearing housing, each of the plurality of retention blocks including: a moveable retention pin positioned through each of the plurality of retention blocks, the moveable retention pin extending radially toward a passage of the bearing housing.

A second aspect of the disclosure provides a system including: a rotor; a shell surrounding at least a portion of the rotor; and a rotor support structure coupled to the shell and configured to receive the rotor, the rotor support structure including: a rigid base component including a top portion; a slide plate positioned above the top portion of rigid base component; a bearing housing for the rotor coupled to the slide plate, the bearing housing and the slide plate configured to slide over the top portion of the rigid base component; and a plurality of retention blocks coupled to the bearing housing, each of the plurality of retention blocks including: a moveable retention pin positioned through each of the plurality of retention blocks, the moveable retention pin extending radially toward a passage of the bearing housing.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
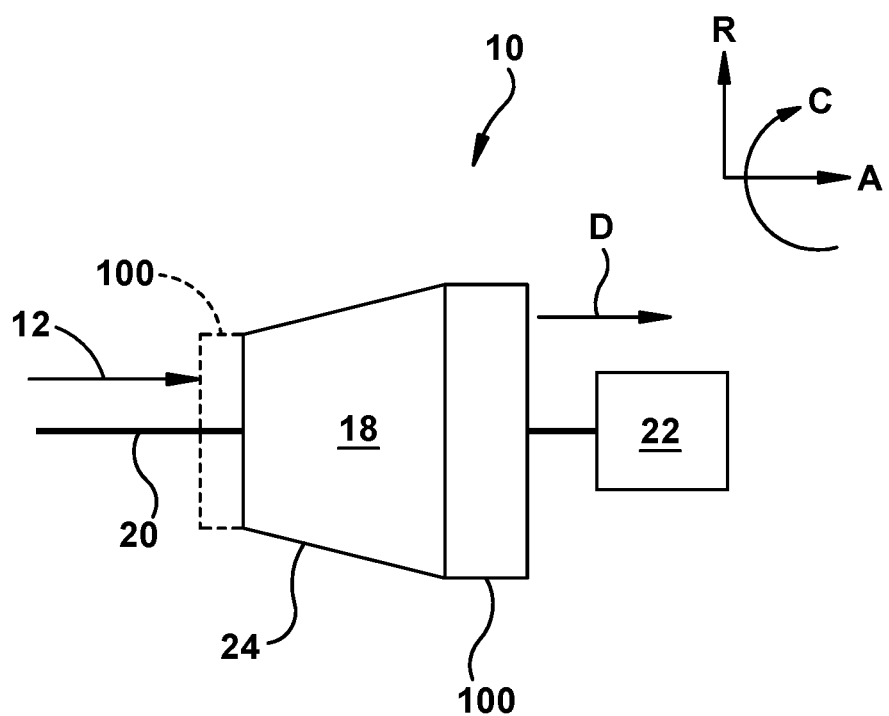
FIG. 1 depicts a schematic diagram of a turbine of a power system according to embodiments.

As an initial matter, in order to clearly describe the current disclosure it will become necessary to select certain terminology when referring to and describing relevant machine components of power systems. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of fluid (e.g., air, steam and the like) through the fluid path or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front, inlet or compressor end of the engine, and "aft" referring to the rearward, exhaust or turbine end of the engine. Additionally, the terms "leading" and "trailing" may be used and/or understood as being similar in description as the terms "forward" and "aft," respectively. It is often required to describe parts that are at differing radial, axial and/or circumferential positions. The "A" axis represents an axial orientation. As used herein, the terms "axial" and/or "axially" refer to the relative position/direction of objects along axis A, which is substantially parallel with the axis of rotation of the power system (in particular, the rotor section). As further used herein, the terms "radial" and/or "radially" refer to the relative position/direction of objects along an axis "R" (see, FIG. 1), which is substantially perpendicular with axis A and intersects axis A at only one location. Finally, the term "circumferential" refers to movement or position around axis A (e.g., axis "C").

As indicated above, the disclosure relates generally to support structures, and more particular, to support structures for rotors of industrial machines.

These and other embodiments are discussed below with reference to FIGS. 1-5. However, those skilled in the art will readily appreciate that the detailed description given herein with respect to these Figures is for explanatory purposes only and should not be construed as limiting.

FIG. 1 shows a schematic view of a portion of a power system 10 as may be used herein. Power system 10 may include a working fluid 12 (e.g., air, steam, combustion gas, and the like) configured to flow through and/or be received by a turbine component 18 (hereafter, "turbine 18") of power system 10. The flow of working fluid 12 is delivered to turbine 18, which typically includes a plurality of turbine blades or buckets and stator vanes (not shown) coupled to a rotor 20 of power system 10. The working fluid 12 drives the turbine blades of turbine 18, and in turn rotates rotor 20 to produce mechanical work and/or to drive an additional component of power system 10. The mechanical work produced in turbine 18 and/or the driving (e.g., rotating) of rotor 20 of power system 10 may drive an external component 22 of power system 10 coupled to rotor 20. The external component 22 of power system 10 may include, but is not limited to a pump, a compressor, an electrical generator and/or the like.

Power system 10 may also include a rotor support structure 100 (hereafter, "support structure 100"). As shown in FIG. 1, support structure 100 may be positioned adjacent turbine 18 of power system 10. More specifically, support structure 100 may be positioned adjacent to and substantially upstream (shown in phantom) and/or downstream of turbine 18. As discussed herein, support structure 100 may be releasably coupled directly to an enclosure or shell 24 that may substantially surround at least a portion of turbine 18. Additionally, and as discussed below in detail, a portion (e.g., bearing housing) of support structure 100 may also be configured to receive and/or support rotor 20 of power system 10 during operation.

Figure 2:
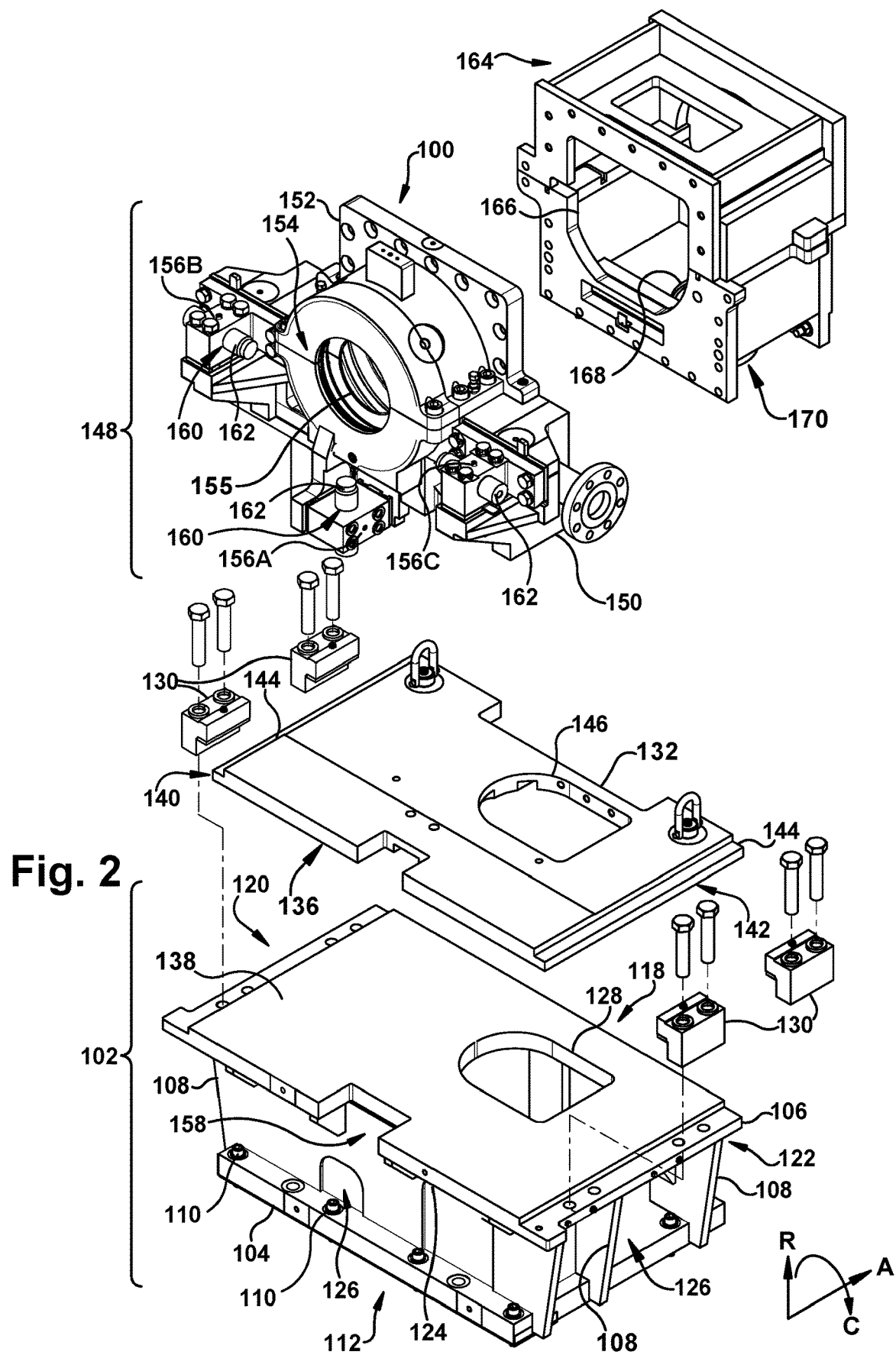
FIG. 2 depicts an isometric exploded view of a rotor support structure for the rotor of the power system of FIG. 1, according to embodiments.
Figure 3:
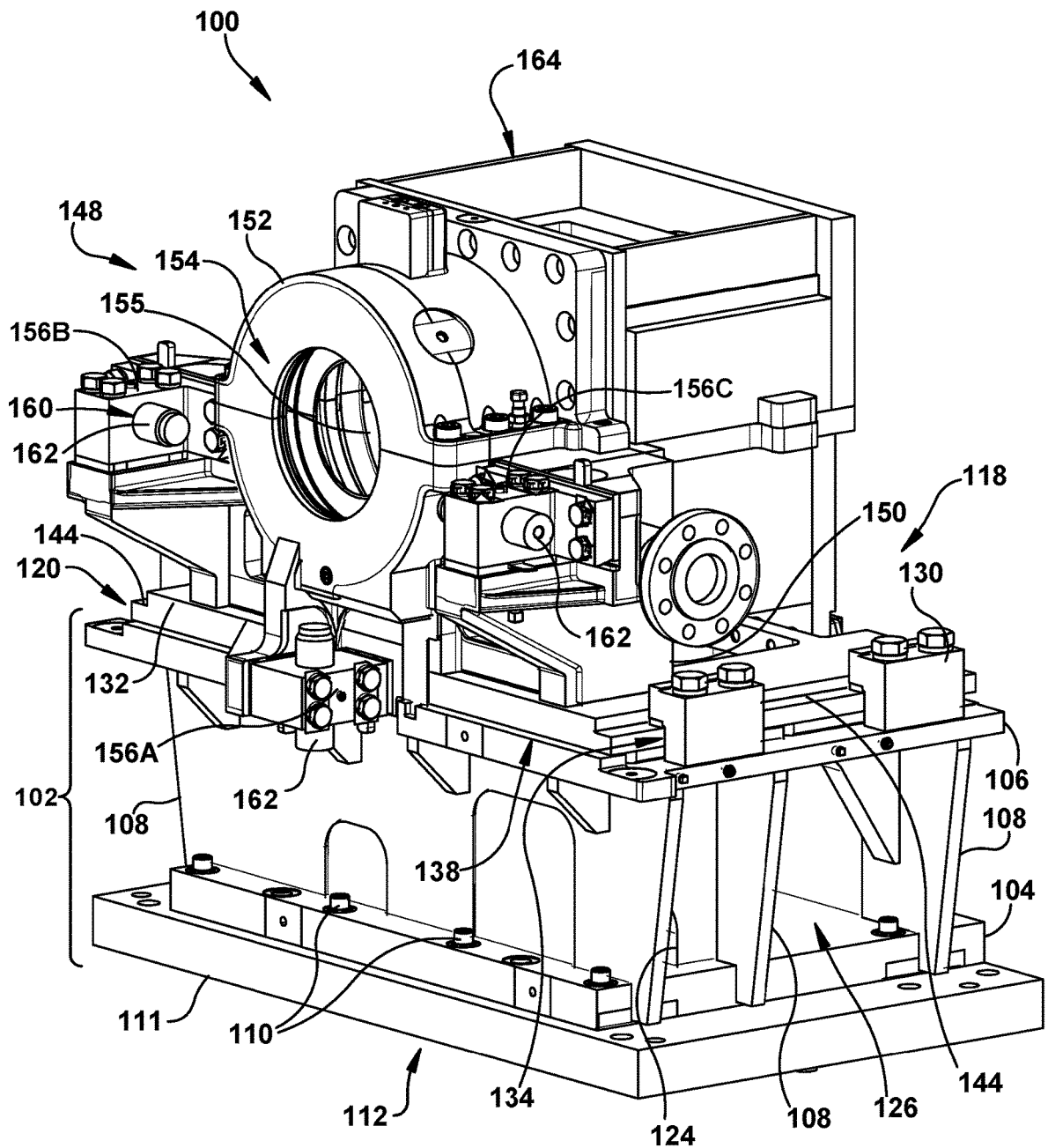
FIG. 3 depicts an isometric front view of the rotor support structure of FIG. 2, according to embodiments.
Figure 4:
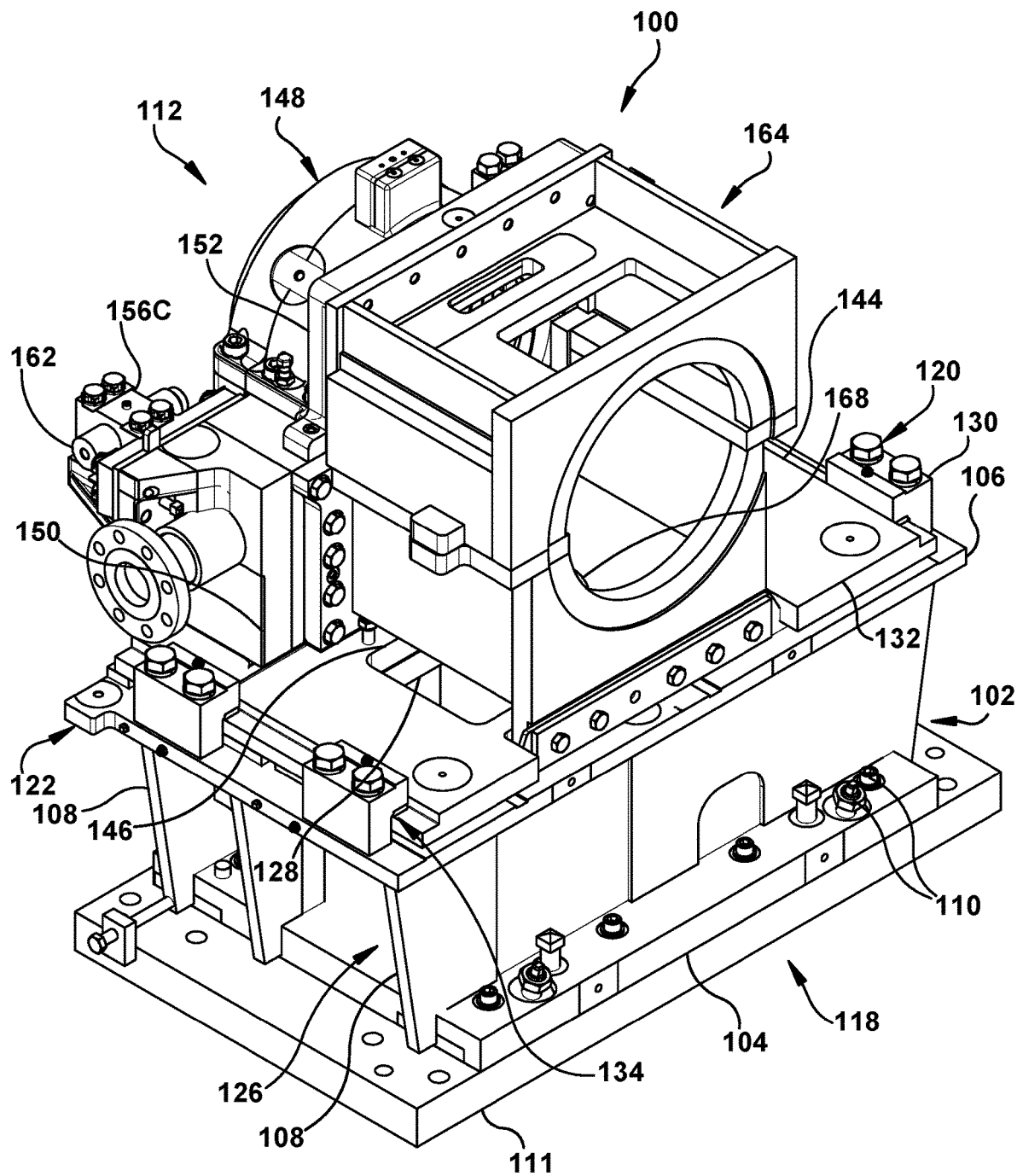
FIG. 4 depicts an isometric rear view of the rotor support structure of FIG. 2, according to embodiments.

FIGS. 2-4 depict various views of support structure 100 of power system 10. Specifically, FIG. 2 depicts an exploded view of support structure 100, FIG. 3 depicts an isometric front view of support structure 100, and FIG. 4 depicts an isometric rear view of support structure 100. As shown in FIGS. 2-4, and discussed in detail below, support structure 100 may be formed from various components and/or features that may be configured to support rotor 20 of power system 10, compensate for thermal expansion of power system 10 components (e.g., rotor 20, shell 24) and/or may reduce or eliminate vibrations of rotor 20 and components (e.g., bearing housing) of support structure 100 during operation of power system 10. Rotor 20 may be omitted from FIGS. 2-4 for clarity.

Support structure 100 may include a rigid base component 102. Rigid base component 102 may be configured to provide support to the remaining components of support structure 100, and/or aid in supporting rotor 20 of power system 10 (see, FIG. 1). As shown in FIGS. 2-4, rigid base component 102 may include a bottom portion 104, a top portion 106 positioned opposite and/or above bottom portion 104, and support struts 108 (hereafter, "struts 108") positioned there between. Bottom portion 104 of rigid base component 102 may include a plurality of coupling and/or securing features 110. In non-limiting examples, securing features 110 may include, but are not limited to mechanical fasteners and coupling components such as bolts, screws, clips, pins and the like. In non-limiting examples, securing features 110 of bottom portion 104 may be configured to couple and/or fix rigid base component 102, and specifically bottom portion 104, to a flooring insert 111 (see, FIG. 3), directly to a floor of power system 10 or to another component capable of being coupled to and supporting rigid base component 102. In another non-limiting example, bottom portion 104 of rigid base component 102 may be permanently fixed to floor insert 111 using any suitable coupling techniques (e.g., welding, brazing and so on).

As shown in FIGS. 2-4, struts 108 may be positioned between bottom portion 104 and top portion 106. Specifically, struts 108 may be positioned between and may be coupled directly to bottom portion 104 and top portion 106, respectively, to support top portion 106 of rigid base component 102 and additional components of support structure 100 positioned on top portion 106. Struts 108 of rigid base component 102 may be formed, positioned and/or oriented to provide stability and rigidity for rigid base component 102 and/or prevent rigid base component 102 from flexing, vibrating and/or moving during operation of power system 10. In a non-limiting example shown in FIGS. 2-4, rigid base component 102 may include a plurality of struts 108 positioned between bottom portion 104 and top portion 106, where one of the plurality of struts 108 is positioned adjacent a rotor end 112 of support structure 100, a second of the plurality of struts 108 is positioned adjacent a governor housing end 118, opposite rotor end 112, and at least one distinct strut 108 positioned between the two distinct struts 108. As shown in FIGS. 2-4, struts 108 may traverse, extend or span substantially between two sides 120, 122 of rigid base component 102. Additionally, cross-members 124 may be formed between and coupled to each strut 108 to provide additional support, stability and/or rigidity to each strut 108 of rigid base component 102. Struts 108 may include various gaps 126 formed within the struts 108 and/or between each distinct strut 108. As discussed in detail below, these gaps 126 may provide space within rigid base component 102 for a pipeline or fluid system of power system 10 (see, FIG. 5).

Top portion 106 of rigid base component 102 may be positioned opposite and/or above bottom portion 104, and struts 108, respectively. As discussed herein, top portion 106 may provide a platform for additional components of support structure 100 to be positioned or supported on and/or may allow distinct components to move axially over top portion 106. As shown in FIG. 2, top portion 106 may include an aperture 128. Aperture 128 may be formed directly through top portion 106 of rigid base component 102. Additionally, at least a portion of aperture 128 may be formed above and/or may be aligned with gap(s) 126 formed by or between struts 108 of rigid base component 102. As discussed below, aperture 128 formed through top portion 106, along with gap(s) 126 between struts 108, may form a passageway through rigid base component 102 for receiving a pipeline or fluid system of power system 10.

Most or all portions of rigid base component 102 may be formed from any suitable material that may be substantially rigid. Specifically, bottom portion 104, top portion 106 and/or struts 108 of rigid base component 102 may be formed from a material that includes high mechanical stability and/or rigidity. In a non-limiting example, bottom portion 104, top portion 106 and/or struts 108 of rigid base component 102 may be formed from metal, metal alloys, concrete and so on. As discussed herein, rigid base component 102 may be formed from a mechanically stable and/or rigid material to prevent rigid base component 102 from flexing, vibrating and/or moving during operation of power system 10.

Support structure 100 may also include a plurality of guides 130. The plurality of guides 130 may be positioned on opposite sides 120, 122 of top portion 106 of rigid base component 102 and may extend above top portion 106. In a non-limiting example shown in FIGS. 2-4, the plurality of guides 130 may be formed as separate components from top portion 106 of rigid base component 102. As a result, the plurality of guides 130 may be coupled or fixed to top portion 106 using any suitable coupling features and/or techniques including, but not limited to, mechanical fastening, welding, brazing, and the like. In another non-limiting example, not shown, the plurality of guides 130 may be formed integral to top portion 106 and may be part of rigid base component 102 of support structure 100.

In the non-limiting example show in FIGS. 2-4, support structure 100 may include two guides 130 positioned on each side 120, 122 of top portion 106. Additionally, each side 120, 122 of top portion 106 may include a first guide 130 positioned adjacent rotor end 112, and a second guide 130 positioned adjacent governor housing end 118, respectively. It is understood that the number of guides 130 shown in the figures is merely illustrative. As such, rigid support structure 100 may include more or less guides 130 than the number depicted and discussed herein.

As shown in FIGS. 2-4, each of the plurality of guides 130 may be positioned on and extend above top portion 106 of rigid base component 102. As discussed herein, the plurality of guides 130 may be configured to maintain or retain a slide plate 132 of support structure 100 above rigid base component 102, while also allowing slide plate 132 to move axially over top portion 106 during operation of power system 10 (see, FIG. 1). As such, the plurality of guides 130 may be formed, shaped, oriented and/or positioned to receive at least a portion of slide plate 132. In the non-limiting example shown in FIGS. 2-4, each guide 130 may be substantially "L-shaped," with a first portion extending above and/or perpendicular to top portion 106, and a second portion extending over and/or substantially parallel to top portion 106. The shape or geometry of guide 130 of support structure 100 may form a channel 134 (see, FIGS. 3 and 4) for receiving and maintaining or retaining slide plate 132 above top portion 106 of rigid base component 102. Briefly turning to FIGS. 3 and 4, the second portion of guide 130 extending over top portion 106 may also extend over a portion of slide plate 132 to maintain or retain slide plate 132 above top portion 106. It is understood that the shape or geometry of guides 130 shown in the figures is merely illustrative. As such, rigid support structure 100 may include guides 130 that have distinct shapes or geometries than those depicted and discussed herein, so long as guides 130 are configured to maintain or retain slide plate 132 above top portion 106 while also allowing slide plate 132 to move axially over top portion 106 of rigid base component 102.

Slide plate 132 of support structure 100 may be positioned above top portion 106 of rigid base component 102. Specifically, slide plate 132 may be positioned above, positioned on, and/or supported by top portion 106 of rigid base component 102. A bottom surface 136 (see, FIG. 2) of slide plate 132 may contact and be configured to slide or move over a top surface 138 (see, FIG. 2) of top portion 106 during operation of power system 10 (see, FIG. 1). Slide plate 132 may be formed from a substantially rigid material having high material strength including, but not limited to, metal, metal alloys, ceramic and so on. In a non-limiting example, slide plate 132 may also be formed from a material having a substantially low coefficient of friction to allow slide plate 132 to easily move and/or slide over top portion 106 of rigid base component 102. Additionally, or alternatively, top portion 106 of rigid base component 102 may be formed from and/or coated with a material having a substantially low coefficient of friction to allow slide plate 132 to easily move and/or slide over top portion 106 of rigid base component 102. In another non-limiting example, slide plate 132 and/or top portion 106 of rigid base component 102 may include additional features (e.g., rollers, bearings, inserts, wheels and the like) that aid in the movement of slide plate 132 over top portion 106.

As shown in FIGS. 2-4, and discussed herein, slide plate 132 may slidingly engage the plurality of guides 130. That is, slide plate 132 may slidingly engage the plurality of guides 130 such that guides 130 may allow slide plate 132 to move in an axial direction during operation of power system 10 without restriction. Additionally guides 130 may slidingly engage and/or contact a portion of slide plate 132 to retain slide plate 132 on rigid base component 102. Specifically, a portion of each of the plurality of guides 130 may be positioned above and/or may contact ends 140, 142 of slide plate 132 to prevent slide plate 132 from being lifted off of and/or away from top portion 106 of rigid base component 102 during operation of power system 10. In a non-limiting example shown in FIGS. 2-4, slide plate 132 may include grooves 144 formed in and/or along opposite ends 140, 142 of slide plate 132. Grooves 144 formed in slide plate 132 may receive a portion and/or slidably engage a portion (e.g., second portion of "L-shaped") of the plurality of guides 130. Grooves 144 formed along ends 140, 142 of slide plate 132 may ensure slide plate 132 is retained on top portion 106 of rigid base component 102, while also aiding in slide plate's 132 ability to move axially over top portion 106, as discussed herein. Although grooves 144 are shown, it is understood that other features or geometries may be included on slide plate 132 to aid in the retention and/or sliding of slide plate 132 during operation of power system 10. For example, slide plate 132 and the plurality of guides 130 may be mated using male-female features formed on each respective part that may allow slide plate 132 to move axially, while being retained on rigid base component 102.

Slide plate 132 may also include an opening 146. Opening 146 may be formed directly through slide plate 132. As shown in FIGS. 2-4, opening 146 formed through slide plate 132 may be at least partially aligned with and positioned above aperture 128 formed through top portion 106 of rigid base component 102. That is, at least a portion of opening 146 formed through slide plate 132 may be positioned above and/or (partially) aligned with aperture of top portion 106 to form a passageway through slide plate 132 and top portion 106 of rigid base component 102. As such, the passageway formed through slide plate 132 and top portion 106 via opening 146 and aperture 128, respectively, may provide access to the space or gap(s) 126 between struts 108 of rigid base component 102. Opening 146 formed through side plate 132, along with aperture 128 of top portion 106 and gap(s) 126 between struts 108, may form a passageway through rigid base component 102 for receiving a pipeline or fluid system of power system 10, as discussed herein.

In the non-limiting example shown in FIG. 2, opening 146 may include a similar or identical size and/or dimension as aperture 128 of top portion 106. Additionally in the non-limiting example, opening 146 formed in slide plate 132 may include a similar or identical shape or geometry as aperture 128 formed through top portion 106. The size and/or shape of opening 146 shown in the figures is merely illustrative. As such, it is understood that the size and/or shape of opening 146 may be distinct from that of aperture 128, so long as opening 146 and aperture 128 are at least partially aligned and form a passageway large enough to receive a pipeline or fluid system of power system 10. Additionally, and as discussed herein, the passageway formed through slide plate 132 and top portion 106 may be large enough to compensate for movement of slide plate 132 during operation of power system 10. The size of the passageway, as determined by size, shape and/or alignment of opening 146 and aperture 128, may ensure the operation of the pipeline or fluid system that may pass through slide plate 132 and top portion 106 of rigid base component 102 is not hindered or disrupted (e.g., pinched, dislodged) during operation of power system 10. That is, the size of the passageway, as determined by size, shape and/or alignment of opening 146 and aperture 128, may be large enough to ensure that when slide plate 132 moves, the pipeline or fluid system is not contacted and/or damaged by slide plate 132.

Support structure 100 may also include a bearing housing 148. As shown in FIGS. 2-4, bearing housing 148 may be coupled to slide plate 132. That is, bearing housing 148 may be coupled to and may be positioned above slide plate 132. In a non-limiting example, slide plate 132 and bearing housing 148 may be permanently coupled or fixed to one another using any suitable coupling technique including, but not limited to, welding, brazing and/or mechanical fastening. Bearing housing 148 may also be coupled to slide plate 132 forward from and/or in front of opening 146 formed through slide plate 132. As such, bearing housing 148 may not cover any portion of opening 146 of slide plate 132. As discussed herein, bearing housing 148 may be configured to receive, support and/or allow rotation of rotor 20 of power system 10 during operation. Additionally, as a result of being coupled to slide plate 132, bearing housing 148 may be configured to move axially over top portion 106 of rigid base component 102, along with slide plate 132, during operation of power system 10.

Bearing housing 148 may be formed from distinct and/or separate portions. That is, and as shown in the non-limiting example in FIGS. 2-4, bearing housing 148 of support structure 100 may be formed from a bottom portion 150 and a top portion 152. Bottom portion 150 of bearing housing 148 may be coupled and/or fixed to slide plate 132. Top portion 152 of bearing housing 148 may be releasably coupled to bottom portion 150. When coupled to each other, bottom portion 150 and top portion 152 of bearing housing 148 may form a passage 154. Positioned within and/or surrounding passage 154 may be a rotor bearing 155 configured to receive rotor 20 of power system 10. Prior to operation, top portion 152 may be removed from bottom portion 150 to allow for rotor 20 to be positioned on bottom portion 150 and a portion of passage 154. Once rotor 20 is positioned on and/or at least partially supported by bottom portion 150, top portion 152 may be releasably coupled to bottom portion 150, and/or may surround the portion of rotor 20 positioned on bottom portion 150 to retain rotor 20 within bearing housing 148 during operation of power system 10.

Support structure 100 may also include a plurality of retention blocks 156. Retention blocks 156 may be coupled to bearing housing 148. Specifically, retention blocks 156 may be releasably coupled to bottom portion 150 of bearing housing 148 and may be configured to move axially with bearing housing 148 and slide plate 132 during operation of power system 10. As discussed herein, shell 24 of power system 10 (see, FIG. 5) may be releasably coupled to each of the plurality of retention blocks 156 to couple support structure 100, and specifically bearing housing 148, to shell 24. In a non-limiting example shown in FIG. 2, support structure 100 may include three retention blocks 156 coupled to bearing housing 148. A first retention block 156A may be positioned (radially) below passage 154 formed by bottom portion 150 and top portion 152 of bearing housing 148. Two distinct retention blocks 156B, 156C may be positioned above first retention block 156A and opposite each other. The two distinct retention blocks 156B, 156C of support structure 100 may also be positioned on substantially opposite sides of passage 154 formed by bottom portion 150 and top portion 152 of bearing housing 148 and/or may be radially aligned with one another. It is understood that the number and/or position of retention blocks 156 shown in the figures is merely illustrative. As such, support structure 100 may include more or less retention blocks 156 than the number depicted and discussed herein, and/or retention blocks 156 may be positioned or oriented on bearing housing 148 of support structure 100 in a variety of locations. Additionally, the geometry and/or shape of each of the plurality of retention blocks 156 are understood to be illustrative, and non-limiting. The geometry and/or shape of each of the plurality of retention blocks 156 may depend on the opening or slot of shell 24 that may be positioned substantially around retention blocks 156 to couple support structure 100 to shell 24, as discussed in detail below.

As shown in FIGS. 2 and 3, first retention block 156A of the plurality of retention blocks 156 may extend radially below most of bearing housing 148. Specifically, a portion of first retention block 156A may extend radially below the majority of bottom portion 150 of bearing housing 148, slide plate 132 and/or at least a portion of top portion 106 of rigid base component 102. In a non-limiting example shown in FIG. 2 where a portion of first retention block 156A extends radially below slide plate 132 and top portion 106, top portion 106 may each include a slot 158. Slot 158 of top portion 106 may be formed in axial and radial alignment with first retention block 156A, on rotor end 112 of rigid base component 102. Slot 158 of top portion 106 may be configured to receive a portion of first retention block 156A and a portion of shell 24 coupled to first retention block 156A (see, FIG. 5). That is, slot 158 of top portion 106 may receive a portion of first retention block 156A and a portion of shell 24 as bearing housing 148 and slide plate 132 move in an axial direction to compensate for the thermal expansion of shell 24 during operation of power system 10, as discussed herein. Forming slot 158 in top portion 106 may allow bearing housing 148 to move axially with slide plate 132 without obstruction and/or without first retention block 156A and/or shell 24 contacting top portion 106 of rigid base component 102.

The plurality of retention blocks 156 may be configured to releasably couple support structure 100, and specifically bearing housing 148, to shell 24 of turbine 18 (see, FIG. 1). Each of the plurality of retention blocks 156 may include an aperture 160 formed there through (see, FIG. 2), and a moveable retention pin 162. Moveable retention pin 162 may be positioned through aperture 160 formed through each of the plurality of retention blocks 156. More specifically, moveable retention pin 162 may extend through aperture 160 of each of the plurality retention blocks 156 and may extend radially toward passage 154 of bearing housing 148 configured to receive rotor 20. As discussed herein, moveable retention pin 162 may be configured to slide through aperture 160 of retention blocks 156 and through an opening formed through a portion of shell 24 of power system 10 that is positioned around each retention block 156 to releasably coupled shell 24 to support structure 100. As discussed herein, moveable retention pins 162 may move within the plurality of retention blocks 156, and bearing housing 148, as a result of shell 24 thermally expanding during operation of power system 10.

As shown in FIGS. 2-4, a governor housing 164 of power system 10 may also be included within and/or coupled to support structure 100. Governor housing 164 may be coupled to bearing housing 148 and/or slide plate 132 of support structure 100. Specifically, governor housing 164 may be positioned axially downstream of and may be releasably coupled to bottom portion 150 and/or top portion 152 of bearing housing 148. Additionally, governor housing 164 may be releasably coupled to and positioned above or on slide plate 132. As a result of being coupled to bearing housing 148 and/or slide plate 132, and being positioned above or on slide plate 132, governor housing 164 may be configured to move axially over top portion 106 of rigid base component 102 with bearing housing 148 and slide plate 132 during operation of power system 10. Governor housing 164 may include a governor device (not shown) that may be configured to measure and/or regulate the speed of rotor 20, which may be received within and/or pass through governor housing 164 via a passage 166.

Governor housing 164 may also include a hole 168. Hole 168 may be formed through a bottom portion 170 of governor housing 164 (see, FIG. 2). As shown in FIGS. 2 and 4, hole 168 may also be formed through a portion of passage 166 of governor housing 164 positioned adjacent bottom portion 170 (see, FIG. 2). Hole 168 formed through governor housing 164 may be at least partially aligned with opening 146 formed through slide plate 132 of support structure 100. That is, at least a portion of hole 168 formed through governor housing 164 may be positioned above and/or (partially) aligned with opening 146 of slide plate 132. Additionally, and as a result of hole 168 being at least partially aligned with opening 146, hole 168 of governor housing 164 may also be at least partially aligned with aperture 128 formed through top portion 106 of rigid base component 102. Aligning hole 168, opening 146 and aperture 128 may form and/or maintain a passageway through top portion 106 of rigid base component 102, slide plate 132 and governor housing 164. As discussed herein, the passageway formed between and/or through top portion 106, slide plate 132 and governor housing 164 may provide a space for a pipeline or fluid system of power system 10.

The size and/or shape of hole 168 formed through governor housing 164 shown in the figures is merely illustrative. As such, it is understood that the size and/or shape of hole 168 may similar or distinct from that of aperture 128 and/or opening 146, so long as hole 168, opening 146 and aperture 128 are at least partially aligned and form a passageway large enough to receive a pipeline or fluid system of power system 10, as discussed herein. Additionally, and as discussed herein, the passageway formed through governor housing 164, slide plate 132 and top portion 106 may be large enough to compensate for movement of slide plate 132 and governor housing 164 during operation of power system 10. The size of the passageway, as determined by size, shape and/or alignment of hole 168, opening 146 and aperture 128, may ensure the operation of the pipeline or fluid system that may pass through slide plate 132 and top portion 106 of rigid base component 102 to governor housing 164 is not hindered or disrupted (e.g., pinched, dislodged) during operation of power system 10.

Figure 5:
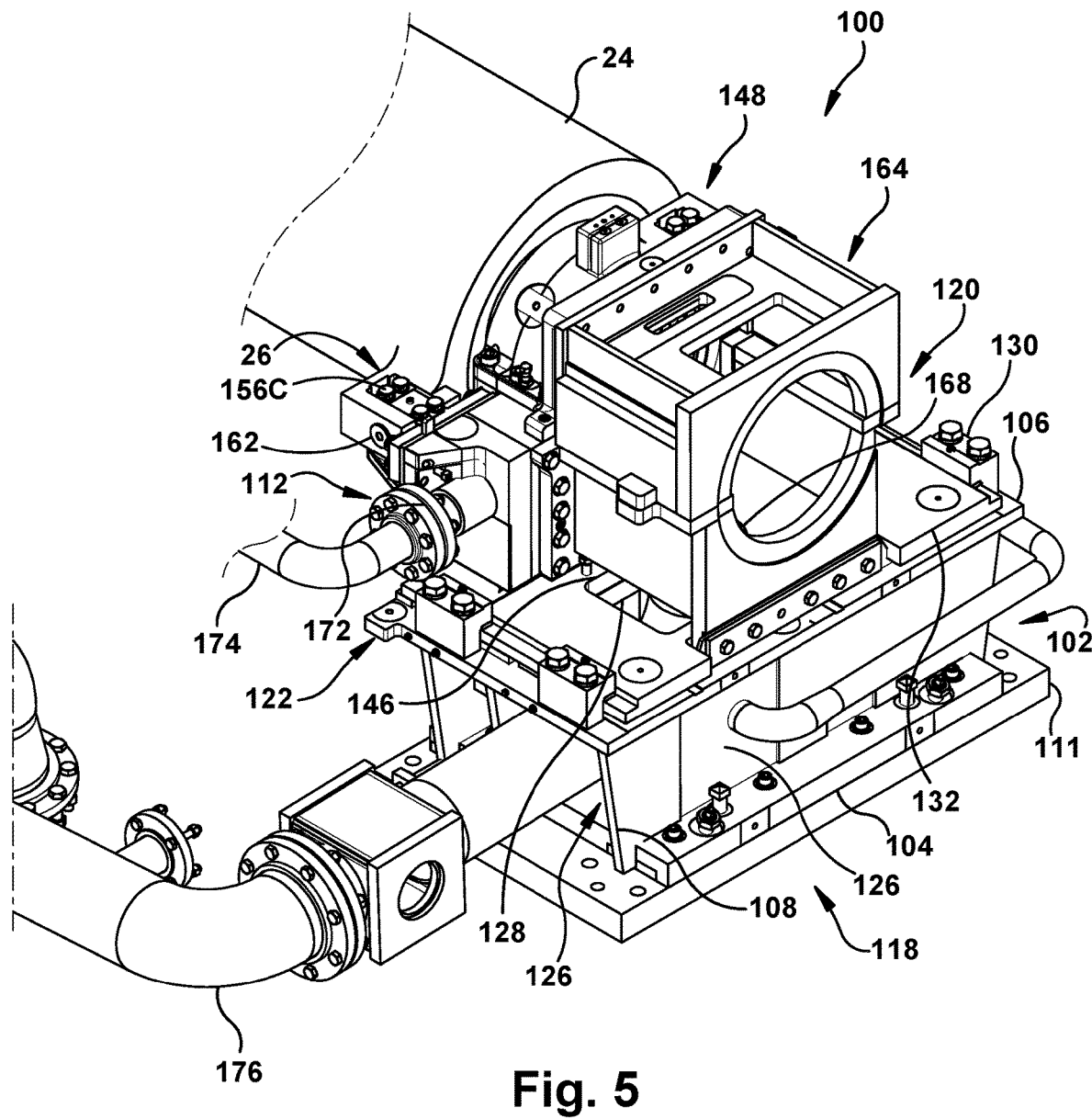
FIG. 5 depicts an isometric rear view of the rotor support structure of FIG. 2 including oil supply and drain pipes, according to embodiments.

Turning to FIG. 5, an isometric rear view of support structure 100 of FIGS. 2-4 including pipelines or fluid systems of power system 10 is shown. It is understood that similarly numbered and/or named components may function in a substantially similar fashion. Redundant explanation of these components has been omitted for clarity.

As shown in FIG. 5, support structure 100 may include an oil inlet 172 positioned on and/or coupled to bearing housing 148. Oil inlet 172 may be positioned adjacent to and may be in fluid communication with passage 154 and/or rotor bearing 155 (see, FIG. 2) positioned within passage 154 of bearing housing 148. An oil supply pipe 174 may be coupled to oil inlet 172 and may be in fluid communication with oil inlet 172 and/or bearing housing 148 of support structure 100. Oil supply pipe 174 coupled to oil inlet 172, and in fluid communication with bearing housing 148, may be configured to supply oil or lubricant to passage 154 and/or rotor bearing 155 of bearing housing 148 to aid in the rotation of rotor 20 of power system 10. Additionally, because oil inlet 172 is positioned on bearing housing 148 and oil supply pipe 174 is coupled to oil inlet 172, oil supply pipe 174 may be configured to move axially with bearing housing 148 and slide plate 132 of support structure 100, as discussed herein. Oil supply pipe 174 may be configured to move axially with bearing housing 148 using any suitable technique and/or component including, but not limited to, flexible or expanding pipe fittings coupled directly to oil inlet 172 or a flexible or expanding pipe fitting positioned downstream of oil inlet 172 and/or support structure 100.

Power system 10 may also include an oil drain pipe 176. As shown in FIG. 5, the majority of oil drain pipe 176 may be positioned below bearing housing 148 of support structure 100. Additionally, oil drain pipe 176 may pass through gap(s) 126 of rigid base component 102 and may extend through aperture 128 of top portion 106 and opening 146 of slide plate 132. That is, oil drain pipe 176 may be positioned within and/or extend through the passageway formed by aperture 128 and opening 146. In a non-limiting example, oil drain pipe 176 may extend radially upward through aperture 128 and opening 146, and may be coupled and/or in fluid communication with hole 168 of governor housing 164. Oil drain pipe 176 coupled to hole 168 of governor housing 164 may be configured to receive oil or lubricant supplied to and utilized by bearing housing 148 via oil supply pipe 174, as discussed herein.

Additionally, because oil drain pipe 176 is coupled to hole 168 of governor housing 164, oil drain pipe 176 may be configured to move axially with governor housing 164 and slide plate 132, as discussed herein. Similar to oil supply pipe 174, oil drain pipe 176 may be configured to move axially with governor housing 164 and slide plate 132 using any suitable technique and/or component including, but not limited to, flexible or expanding pipe fittings coupled directly to hole 168 of governor housing 164 or a flexible or expanding pipe fitting positioned downstream of governor housing 164 and/or support structure 100.

The size of the passageway formed by aperture 128 and opening 146 may be reduced as slide plate 132 moves axially over top portion 106 during operation of power system 10. As a result, and because oil drain pipe 176 passes through aperture 128 and opening 146, oil drain pipe 176 may have a size, shape and/or geometry that may prevent oil drain pipe 176 from contacting a side of aperture 128 formed in top portion 106 as governor housing 164 and slide plate 132 move axially over top portion 106. This may prevent obstruction and/or restricted movement of slide plate 132, bearing housing 148 and/or governor housing 164 as these components move axially over rigid base component 102 during operation of power system 10.

As shown in FIG. 5, and discussed herein, support structure 100 may be coupled to shell 24 of turbine 18. Specifically, the plurality of retention blocks 156 and/or moveable retention pins 162 may be coupled to and/or may couple bearing housing 148 of support structure 100 to shell 24. In the non-limiting example shown in FIG. 5, a portion 26 (one shown) of shell 24 may be positioned substantially around/surround each retention block 156 (one shown, retention block 156C) and/or may contact each of the plurality of retention blocks 156. Once portion 26 of shell 24 is positioned substantially around and/or contacts each of the plurality of retention blocks 156, retention pin 162 of each retention block 156 may be positioned through portion 26 of shell 24 and aperture 160 (see, FIG. 2) formed through retention blocks 156, respectively, to couple shell 24 to retention blocks 156 and bearing housing 148. After retention pins 162 are positioned through portion 26 of shell 24 and retention blocks 156, shell 24 may be fixed and/or may be prevented from moving axially within power system 10 (see, FIG. 1).

Additionally as discussed herein, during operation of power system 10, components (e.g., rotor 20, shell 24) of power system 10 may thermally expand, and support structure 100 may move and/or adjust to compensate for this thermal expansion. For example, as rotor 20 and/or shell 24 thermally expand in the axial direction of rotor 20 (see, FIG. 1), slide plate 132 may move axially and/or allows for bearing housing 148, the plurality of retention blocks 156 and/or governor housing 164 to also move axially with these thermally expanding components of power system 10. As discussed herein, by coupling portion 26 of shell 24 to retention blocks 156 using retention pins 162, retention pins 162 and/or retention blocks 156 may only allow shell 24 to move axially. By moving axially and/or being configured to be moved axially by thermally expanding shell 24, moveable retention pins 162 of retention blocks 156 may allow retention blocks 156 to maintain a coupling within shell 24, and ultimately maintain a coupling between shell 24 and support structure 100.

Although discussed herein as being utilized by a general power system, it is understood that the support structure described above may be used by various systems and/or machines. That is, the support structure shown and discussed herein may be utilized by a steam turbine system, a gas turbine system, a power plant or combined cycle system (e.g., gas and steam turbine system). Additionally, the support structure discussed above may be utilized in various industrial machines or systems that include a rotor or spinning shaft, and components that may undergo thermal expansion due to heat generation by the machine during operation.

In various embodiments, components described as being "fluidly coupled" to or "in fluid communication" with one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
    a rotor;
    a shell surrounding at least a portion of the rotor; and
    a rotor support structure positioned adjacent the shell and configured to receive the rotor, the rotor support structure including:
        a rigid base component including:
            a top portion, and
            an aperture formed directly through the top portion;
        a slide plate positioned above the top portion of rigid base component, the slide plate including an opening formed directly through the slide plate,
            wherein the opening formed directly through the slide plate is at least partially aligned with the aperture formed directly through the top portion of the rigid base component;
        a bearing housing for the rotor coupled to the slide plate, the bearing housing and the slide plate configured to slide over the top portion of the rigid base component; and
        a plurality of retention blocks coupled to the bearing housing, each of the plurality of retention blocks including:
            a moveable retention pin positioned through each of the plurality of retention blocks, the moveable retention pin extending radially toward a passage of the bearing housing;
        a governor housing coupled to the bearing housing of the rotor support structure, the governor housing including a hole positioned above and aligned with the opening formed in the slide plate of the rotor support structure; and
        an oil drain pipe coupled to the hole of the governor housing, the oil drain pipe extending through the opening formed through the side plate and the aperture formed through the top portion of the rigid base component,
            wherein the oil drain pipe is configured to move axially with the governor housing.

2. The system of claim 1, wherein the rotor support structure further includes:
    a plurality of guides positioned on opposite sides of the top portion of the rigid base component, the plurality of guides slidably engaging the slide plate.

3. The system of claim 2, wherein the slide plate of the rotor support structure further includes grooves formed along opposite sides of the slide plate, the grooves configured to receive and slidably engage at least one of the plurality of guides.

4. The system of claim 1, wherein the governor housing is coupled to the slide plate of the rotor support structure and configured to move axially over the top portion with the slide plate and the bearing housing.

5. The system of claim 1, wherein a portion of the shell is positioned substantially around and contacts each of the plurality of retention blocks.

6. The system of claim 5, wherein the moveable retention pin of each of the plurality of retention blocks extends through:
    the portion of the shell positioned substantially around the retention block; and
    the retention block.

7. The system of claim 1, wherein the top portion of the rigid base component includes a slot aligned with one of the plurality of retention blocks, the slot configured to receive the portion of the shell substantially surrounding the retention block.

8. The system of claim 1, further comprising:
    an oil supply pipe in fluid communication with the bearing housing of the rotor support structure, the oil supply pipe configured to move axially with the bearing housing and the slide plate.

* * * * *